United States Patent
Taft et al.

(10) Patent No.: US 9,738,555 B2
(45) Date of Patent: Aug. 22, 2017

(54) ELECTROLESS NICKEL PLATING OF A HIGH TEMPERATURE POWER FEEDTHROUGH FOR CORROSION INHABITANCE

(71) Applicant: CORNING INCORPORATED, Corning, NY (US)

(72) Inventors: Terry Lee Taft, Big Flats, NY (US); Kim E Womer, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 414 days.

(21) Appl. No.: 13/904,123

(22) Filed: May 29, 2013

(65) Prior Publication Data
US 2014/0355641 A1 Dec. 4, 2014

(51) Int. Cl.
*C03B 5/027* (2006.01)
*C03B 5/167* (2006.01)
*H05B 3/03* (2006.01)

(52) U.S. Cl.
CPC .......... *C03B 5/1672* (2013.01); *C03B 5/027* (2013.01); *H05B 3/03* (2013.01); *Y10T 29/49083* (2015.01)

(58) Field of Classification Search
CPC .................................................. C03B 5/1672
USPC ........ 373/29, 30, 36, 37, 38, 52, 81, 91, 92, 373/100, 94
See application file for complete search history.

(56) References Cited

U.S. PATENT DOCUMENTS

| | | | |
|---|---|---|---|
| 2,591,709 A | * | 4/1952 | Lubatti ........................ 373/54 |
| 2,978,526 A | | 4/1961 | Olson |
| 3,257,305 A | * | 6/1966 | Varga ................. C23C 14/0036 204/192.15 |
| 3,777,040 A | | 12/1973 | Gell et al. |
| 4,126,757 A | | 11/1978 | Smith, Jr. et al. |
| 4,366,571 A | | 12/1982 | Palmquist |
| 4,413,346 A | | 11/1983 | Palmquist |
| 4,468,779 A | | 8/1984 | Gillman |
| 4,965,812 A | | 10/1990 | Sorg et al. |
| 5,283,803 A | | 2/1994 | Kottnauer et al. |
| 5,912,916 A | * | 6/1999 | Hendrix ........................ 373/94 |
| 2005/0286604 A1 | | 12/2005 | Rott |

(Continued)

OTHER PUBLICATIONS

Wikipedia. Printed May 9, 2013. "Electroless Nickel Plating." http://en.wikipedia.org/wiki/Electroless_nickel_plating. 4 Pages.

*Primary Examiner* — Phuong Nguyen
(74) *Attorney, Agent, or Firm* — Svetlana Z. Short

(57) ABSTRACT

A method of making an electrode assembly for a furnace includes providing a heating element within the furnace. The method further includes providing a power feedthrough having an end portion that extends into the furnace to couple with the heating element. The power feedthrough includes a conductive member for transmitting electricity to the heating element. The method includes cleaning an exterior surface of the conductive member proximate the end portion of the power feedthrough. The method further includes a step of applying an electroless nickel plating to the exterior surface of the conductive member for preventing corrosion of the conductive member within the furnace. The method also includes connecting the end portion of the power feedthrough to the heating element.

14 Claims, 5 Drawing Sheets

(56) References Cited

U.S. PATENT DOCUMENTS

2008/0202937 A1* 8/2008 Juncker et al. ............... 205/167
2011/0172135 A1* 7/2011 Dunning .................. C09G 1/12
510/242

* cited by examiner

ELECTROLESS NICKEL PLATING OF A HIGH TEMPERATURE POWER FEEDTHROUGH FOR CORROSION INHABITANCE

BACKGROUND

The present invention generally relates to a method of making an electrode assembly for a furnace and, more particularly, relates to a method of applying electroless nickel plating to a portion of a power feedthrough that is exposed to high temperatures.

Conventional electrode assemblies for high temperature vacuum furnaces typically include a power feedthrough that extends into an interior portion of the furnace to connect with a heating element. The portion of the power feedthrough adjacent to the heating element, in some circumstances, may corrode and contaminate materials introduced into the interior portion of the vacuum furnace and the exterior walls of the vacuum furnace. Significant efforts have been made to improve the power feedthrough while maintaining mostly efficient power transmission and reducing the potential corrosive nature of the feedthrough. However, power feedthroughs generally require frequent replacement due to failed attempts at reducing the corrosive nature thereof. This frequent replacement can be detrimental for efficient operation of the furnace and typically requires deactivation, as well as costly and timely cleaning of the furnace prior to replacing the power feedthrough.

SUMMARY

It is therefore desireable to provide a method of making an electrode assembly for a furnace without the drawbacks of prior approaches. According to one embodiment, a method of making an electrode assembly for a furnace is provided. The method includes providing a heating element within the furnace. The method further includes providing a power feedthrough having an end portion that extends into the furnace to couple with the heating element. The power feedthrough includes a conductive member for transmitting electricity to the heating element. The method includes cleaning an exterior surface of the conductive member proximate the end portion of the power feedthrough. The method further includes a step of applying an electroless nickel plating to the exterior surface of the conductive member for preventing corrosion of the conductive member within the furnace. The method also includes connecting the end portion of the power feedthrough to the heating element.

According to another embodiment, a method of making a power feedthrough for a furnace is provided. The method includes providing a copper shaft having an exterior surface, a distal end with an axial cavity, and a proximal end configured to couple with the heating element within the furnace. The copper shaft is also configured to transmit electricity to a heating element within the furnace. The method further includes cleaning at least the exterior surface of the copper shaft proximate the proximal end to provide a clean surface. The method also includes a step of applying an electroless high phosphorus nickel plating to the clean surface for preventing corrosion of the copper shaft within the furnace.

According to another embodiment, an electrode assembly for a furnace includes a heating element for residing within the furnace. The electrode assembly also includes a power feedthrough for extending into the vacuum furnace. The power feedthrough includes a conductive member having an exterior surface, a proximal end coupled with the heating element, and a distal end having an axial cavity. A liquid coolant line extends within the axial cavity of the conductive member. An electroless nickel plating is disposed over the exterior surface of the conductive member for preventing corrosion of the conductive member within the furnace.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
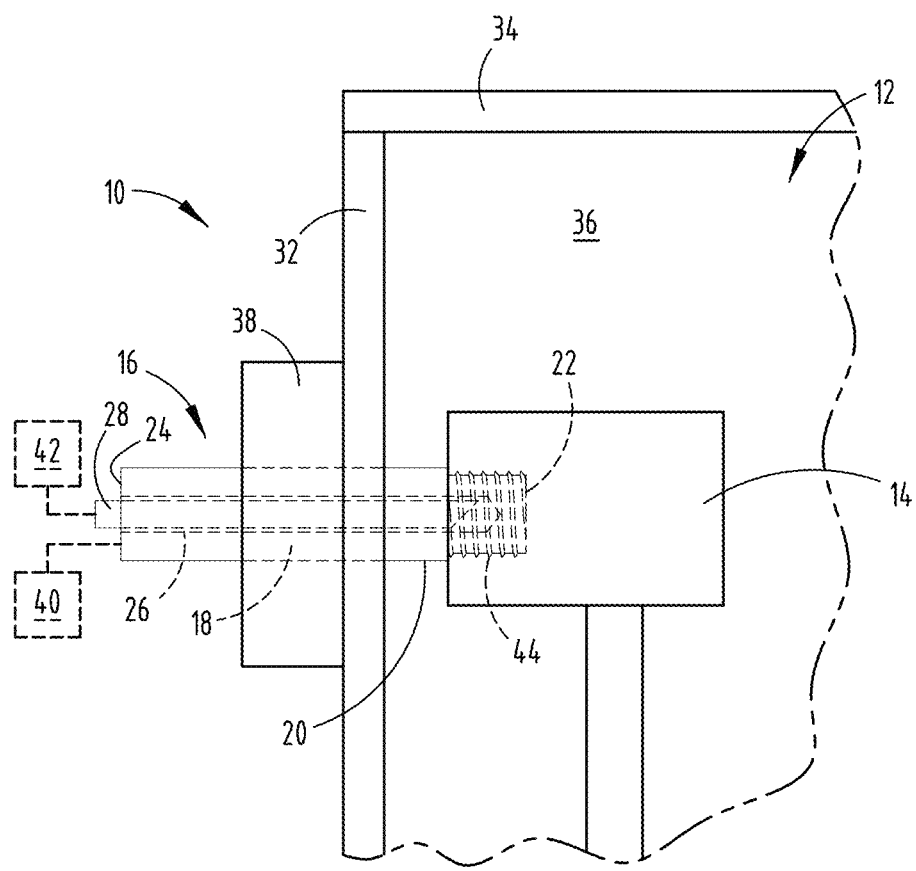
FIG. 1 is a cross-sectional view of a corner portion of a furnace that illustrates a power feedthrough connected with a heating element, according to a first embodiment.

Reference will now be made in detail to the present preferred embodiments, examples of which are illustrated in the accompanying drawings. Whenever possible, the same reference numerals will be used throughout the drawings to refer to the same or like parts.

Referring to the embodiments illustrated in FIGS. 1-11, reference numeral 10 generally designates an electrode assembly for a furnace 12. The electrode assembly 10 includes a heating element 14 within the furnace 12 and a power feedthrough 16 that extends into the furnace 12 and couples with the heating element 14. The power feedthrough 16 has a conductive member 18 that includes an exterior surface 20, a proximal end 22 coupled with the heating element 14, and a distal end 24 having an axial cavity 26. A liquid coolant line 28 extends within the axial cavity 26 of the conductive member 18. An electroless nickel plating 30 is disposed over the exterior surface 20 of the conductive member 18 for preventing corrosion of the conductive member 18 within the furnace 12.

Referring to FIG. 1, a corner portion of the furnace 12 is shown with the power feedthrough 16 coupled with the heating element 14 within the furnace 12, according to a one embodiment. The furnace 12 in the illustrated embodiment is a high temperature furnace for melting glass and other conceivable thermo-plastic materials that are capable of reaching temperatures over 2300° C. The furnace 12 typically operates above 500° C., and more typically in the range between 1000° C. and 2000° C. More specifically, the high temperature furnace 12 of one embodiment includes pre-forming glass for use in making optical lenses. However, it should be appreciated that the furnace 12 may be used for other high temperature purposes. The illustrated furnace 12 includes a sidewall 32 and a top cover 34 that together form a substantially air sealed vessel that is capable of retaining a vacuum pressure atmosphere 36. It is contemplated that the furnace 12, including the sidewall 32 and top cover 34, may include various geometric arrangements and material compositions. For instance, the furnace 12 may include a layer of refractory material and an interior metal liner, such as molybdenum, tungsten, noble metals, or other conceivable materials or combinations thereof, to prevent corrosion of the refractory material. Furthermore, the furnace 12 may conceivably be a water jacketed vessel to reduce heat proximate an interior wall of the vessel.

With further reference to FIG. 1, a bracket 38 is attached to an outside surface of the sidewall 32 and includes an aperture that aligns with an opening in the sidewall 32 for receiving the power feedthrough 16. It is understood that the power feedthrough 16 may alternatively extend into the furnace 12, such as through the top cover 34 or other portion of the furnace 12 and at alternative angles or positions relative to the furnace 12. An exterior portion of the power feedthrough 16, proximate the distal end 24, couples with a cable that extends to a power source 40 for transmitting electric current to the heating element 14. Also, a coolant unit 42 outside the furnace 12 connects with the coolant line 28 that extends within the power feedthrough 16 for circulating a liquid coolant. It is understood that in some embodiments it may be sufficient to exclude the coolant line 28 from the power feedthrough 16 or employ alternative means of cooling the power feedthrough 16.

Within the furnace 12 of the embodiment illustrated in FIG. 1, an interior portion of the power feedthrough 16, proximate the proximal end 22, is threadably coupled with a threaded receptacle 44 on the heating element 14. It is conceivable that the power feedthrough 16 may alternatively engage with the heating element 14, such as by a means of clamping. The heating element 14 receives electrical current transmitted from the power feedthrough 16, which is delivered by the power source 40, to produce heat by means of electrical resistance within the heating element 14. Conceivably the heating element 14 may be completely or partially submerged in molten glass within the furnace 12 or may be solely exposed to the gaseous atmosphere within the furnace 12. During operation of the furnace 12, the gaseous atmosphere 36 may contain corrosive gases, such as chlorine, as generally understood by one having ordinary skill in the art. The heating element 14 in the illustrated embodiment is a graphite material, but it is understood that the heating element 14 may include or otherwise consist of materials having similar resistive and heat generating properties to graphite.

Figure 2:
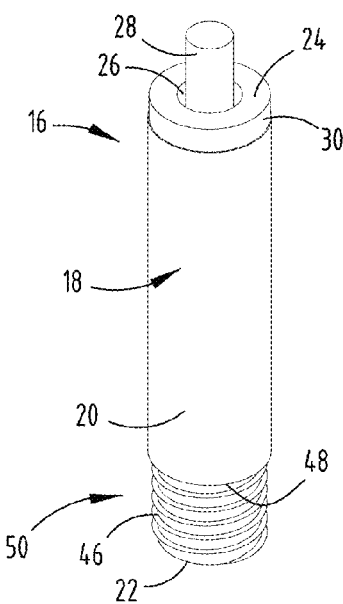
FIG. 2 is top perspective view of the power feedthrough shown in FIG. 1.
Figure 3:
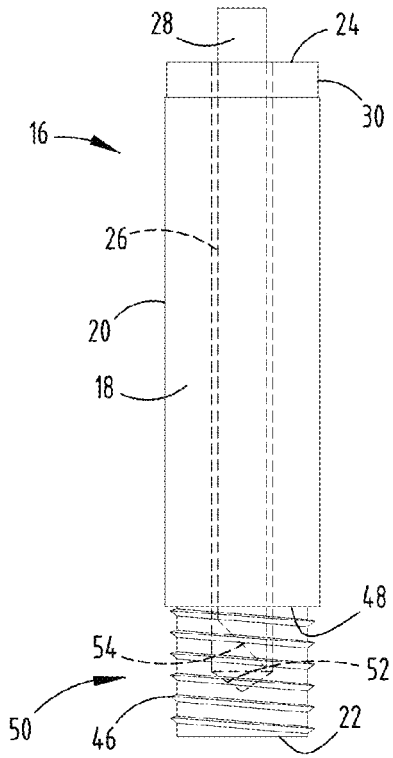
FIG. 3 is a side elevational view of the power feedthrough shown in FIG. 1, illustrating a liquid coolant line extending within an axial cavity of the power feedthrough.

As illustrated in FIGS. 2-3, one embodiment of the power feedthrough 16 is shown having a cylindrical shape with threads 46 formed on the exterior surface 20 between the proximal end 22 and a radially protruding shoulder 48 to define a connection portion 50 of the power feedthrough 16 that engages within the threaded receptacle 44 of the heating element 14 (FIG. 1). The threads 46 illustrated are merely one exemplary embodiment and may include various thread forms, angles, and arrangements. The axial cavity 26 of the power feedthrough 16 is defined by a cylindrical hole that extends coaxially within the distal end 24 of the conductive member 18 to a bottom surface 52, within the connection portion 50 but spaced from the proximal end 22. The bottom surface 52 of the axial cavity 26 has a concave conical shape that is configured to redirect the liquid coolant that is dispensed from the coolant line 28 away from the bottom surface 52 and towards the distal end 24 of the power feedthrough 16.

As also shown in FIGS. 2-3, the coolant line 28 generally extends coaxially within the axial cavity 26 and is illustrated with an angled opening 54 adjacent to the bottom surface 52 of the axial cavity 26 for dispensing the liquid coolant. The angled opening 54 is positioned such that upon the liquid coolant exiting the coolant line 28, the liquid coolant is directly exposed to the base surface 52 to cool the connection portion 50 of the power feedthrough 16. The initial exposure of the coolant to the connection portion 50 is desired, as the connection portion 50 is typically the hottest portion of the power feedthrough 16, given its close proximity to the heating element 14 and interfaces where the electrical current meets the resistive heating element 4. Upon contacting the bottom surface 52, the liquid coolant is directed along the sidewalls of the axial cavity 26 toward the distal end 24. Again, it is conceivable that the coolant line 28 may be omitted or alternatively arranged within the power feedthrough 16 to circulate liquid coolant for reducing temperature of the power feedthrough 16 for more efficient electrical transmission and conductivity.

Figure 4:
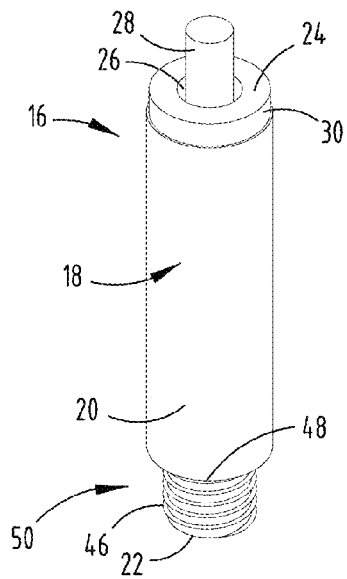
FIG. 4 is top perspective view of a power feedthrough, according to a second embodiment.
Figure 5:
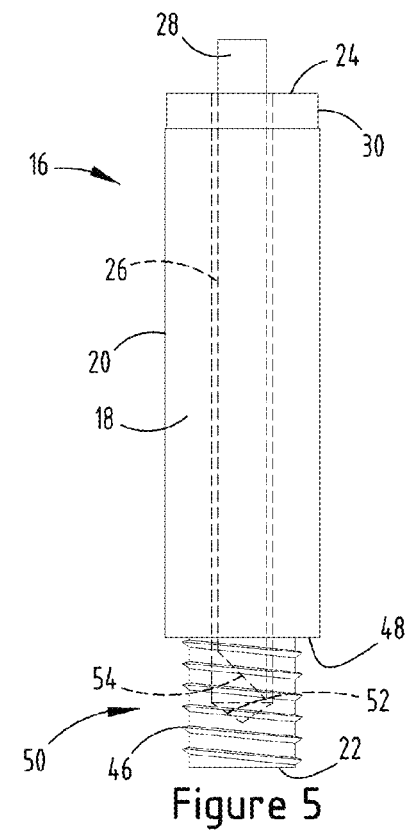
FIG. 5 is a side elevational view of the power feedthrough shown in FIG. 4, illustrating a liquid coolant line extending within an axial cavity of the power feedthrough.

An additional embodiment of the power feedthrough 16 is illustrated in FIGS. 4-5. In this additional embodiment the connection portion 50 has a smaller diameter than the embodiment illustrated in FIGS. 3-4, such that the radially protruding shoulder 48 has a larger surface area to contact the heating element 14 upon threadably engaging the connection portion 50. In view of the skin effect, electrical current transmitted through the power feedthrough 16 will tend to concentrate near the outside surface 20 of the conductive member 18 and, in the illustrated additional embodiment, transmit from the radially protruding shoulder 48 directly to the heating element 14, thereby reducing the amount of current transmitted through the threads 46 on the connection portion 50. In some instances, this arrangement can result in reducing heat proximate the threads 46, and accordingly reduce the corrosion to the threads 46 over extended periods of use.

Figure 6:
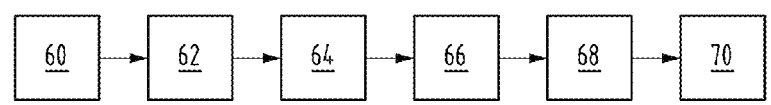
FIG. 6 is a flow chart of the method of making the electrode assembly, according to a first embodiment.

With respect to the method of making the electrode assembly 10 for the furnace 12, FIG. 6 illustrates a general flow chart. At step 60 of the method, the heating element 14 is provided for use within the furnace 12. At step 62, a power feedthrough 16 is provided that has an end portion for extending into the furnace 12 to couple with the heating element 14. The power feedthrough 16 includes the conductive member 18 for transmitting electricity to the heating element 14. The method next includes the step 64 of cleaning an exterior surface 20 of the conductive member 18 proximate the end portion of the power feedthrough 16. The method further includes a step 66 of applying an electrolytic sulfamate nickel plating to the clean surface before the electroless nickel plating 30 is applied to the conductive member 18. Accordingly, the following step 68 includes applying the electroless nickel plating 30 to the exterior surface 20 of the conductive member 18 for preventing corrosion of the conductive member 18 within the furnace 12. Once the electroless nickel plating 30 is applied, the method includes a step 70 of connecting the end portion of the power feedthough to the heating element 14.

Figures 7, 8, 9:
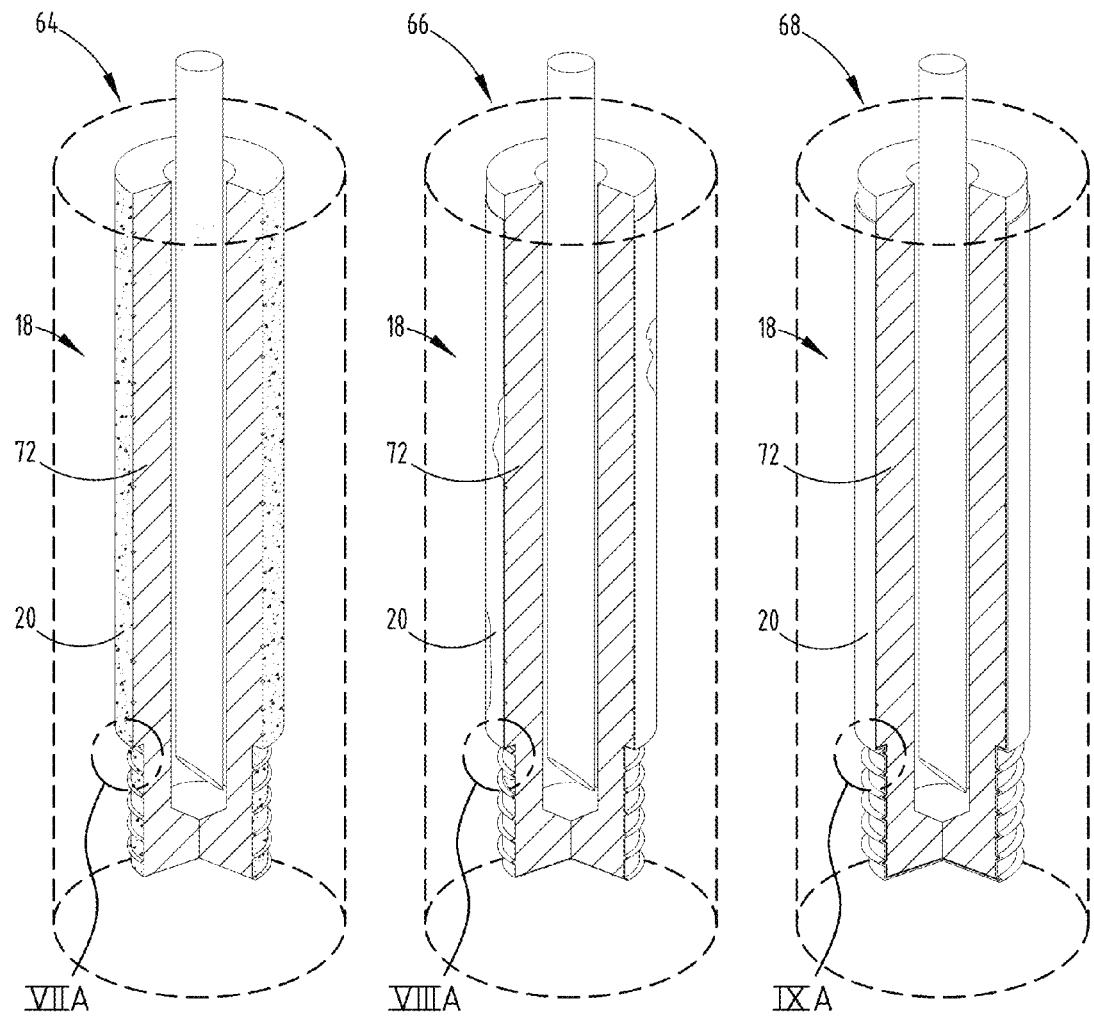
FIG. 7 is a top perspective cross-sectional view of the power feedthrough at a stage of cleaning an exterior surface of a copper shaft, according to a first embodiment.
FIG. 8 is a top perspective cross-sectional view of the power feedthrough at a stage of applying electrolytic nickel plating to the copper shaft, according to a second embodiment.
FIG. 9 is a top perspective cross-sectional view of the power feedthrough at a stage of applying electroless nickel plating to the copper shaft, according to a third embodiment.
Figure 7A:
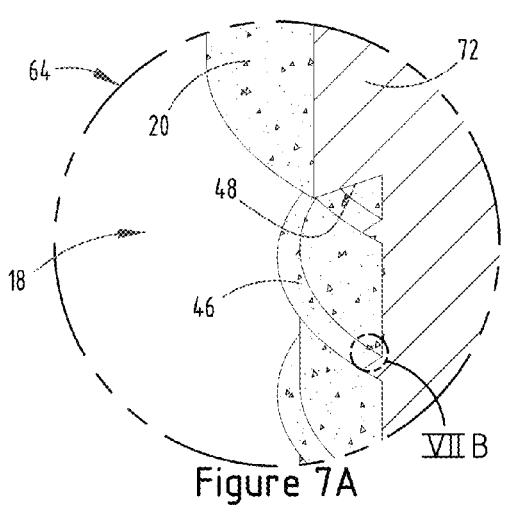
FIG. 7A is an enlarged cross-sectional perspective view of the exterior surface of the copper shaft, taken from section VIIA in FIG. 7.
Figure 7B:
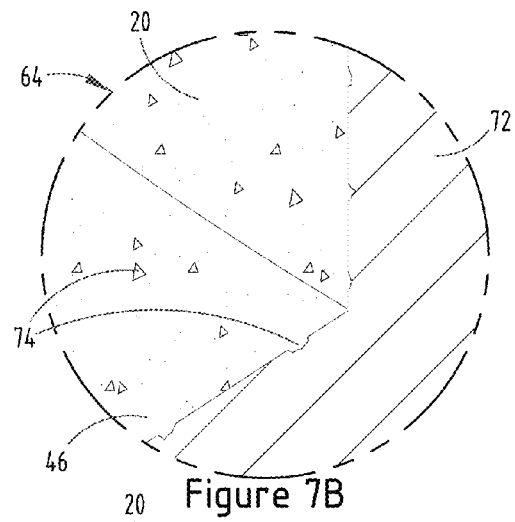
FIG. 7B is an enlarged cross-sectional perspective view of the exterior surface of the copper shaft, taken from section VIIB in FIG. 7A.

As shown in FIGS. 7-7B, the conductive member 18 is illustrated after the cleaning step 64, such that a copper shaft 72 is shown without an electrolytic or electroless nickel plating 30 (FIG. 9). It is contemplated that the conductive member 18 may employ an alternative metal shaft from the copper shaft 72 as the core piece of the conductive member 18. The cleaning step 64 is primarily done to remove oils, scaling, and other debris from the exterior surface 20 of the conductive member 18, such that the plating may more easily adhere to the exterior surface 20. More specifically, cleaning may include applying a chemical solution to the exterior surface 20 of the copper shaft 72 that may be an aqueous solution having one or more hydroxycarboxylic acids or salts, one or more surfactants, one or more reducing agents, or other additives or combinations thereof, as generally understood by one having ordinary skill in the art. The cleaning 64 may also or alternatively include applying a copper flash to the exterior surface 20 of the copper shaft 72, which similarly acts to prepare the exterior surface 20 for the nickel plating. As illustrated in FIG. 7B, the exterior surface 20 is shown with pitting 74 in the copper shaft 72 generally free of debris.

Figure 8A:
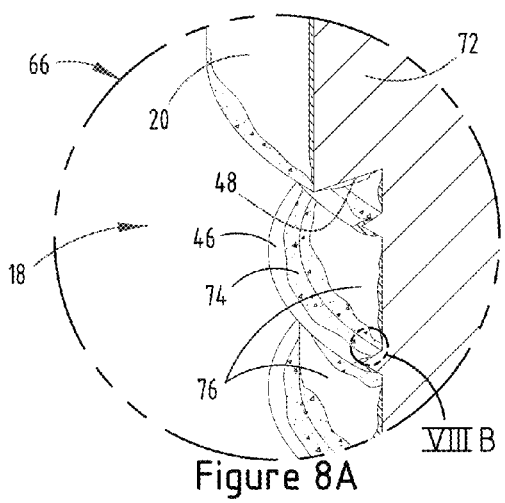
FIG. 8A is an enlarged cross-sectional perspective view of the power feedthrough after the application of electrolytic nickel plating, taken from section VIIIA in FIG. 8.
Figure 8B:
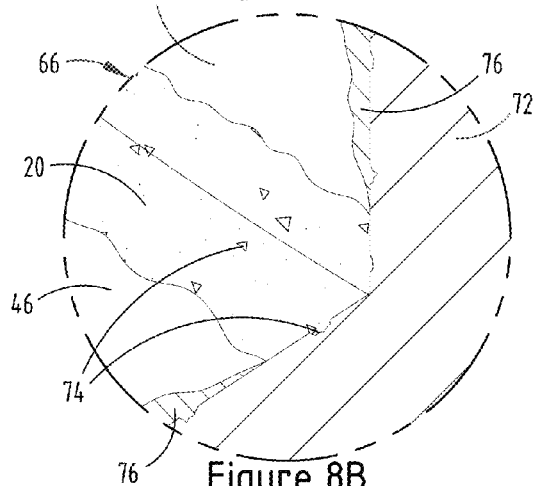
FIG. 8B is an enlarged cross-sectional perspective view of the power feedthrough after the application of electrolytic nickel plating, taken from section VIIIB in FIG. 8A.

Referring now to FIGS. 8-8B, the copper shaft 72 may undergo the step 66 of applying an electrolytic sulfamate nickel plating 76, which is also known as electro-deposition. To electro-deposit nickel onto the exterior surface 20, a negative charge is applied to the conductive member 18, such as by attaching a wire that leads to a battery or other power supply. Once attached, a rod made of nickel is connected in a similar fashion to the positive side of the battery or power source. The conductive member 18 is then submerged in a bath that includes a salt with the nickel. The negative charge of the conductive member 18 attracts the positive nickel ions in the bath and the positive charge of the nickel rod attracts the negative chloride anions, whereby a voltage range generally between 3 and 4 volts DC is applied for the conductive member 18 of the illustrated embodiment. Ultimately, through this chemical reaction, oxidized nickel from the rod is attracted to the conductive member 18 to apply the electrolytic sulfamate nickel plating 76.

As shown in FIGS. 8A-8B, the electrolytic sulfamate nickel plating 76 is not evenly distributed on the exterior surface 20 of the copper shaft 72 and is most uneven proximate the threads 46 on the connection portion 50. In the exemplary embodiment illustrated in FIG. 8B, the electrolytic nickel plating 76 fails to adhere in corner areas near the threads 46 and radially protruding shoulder 48. As such, the thickness greatly varies, but preferably is less than 0.001 inches, and more preferably has a thickness between 0.0002 and 0.0004 inches. With respect to this method, the electrolytic nickel plating 76 is applied as a striker layer, otherwise known as a thin layer to allow the electroless nickel plating 30 (FIG. 9) to more easily adhere to the conductive member 18. Accordingly, it is understood that the step of applying the electrolytic nickel plating 76 may be omitted in some embodiments where the electroless nickel plating 30 alone is sufficient and adequately adhered. Further, the step of applying the electrolytic nickel plating 76 may substitute for the cleaning step 64 in some embodiments.

Figure 9A:
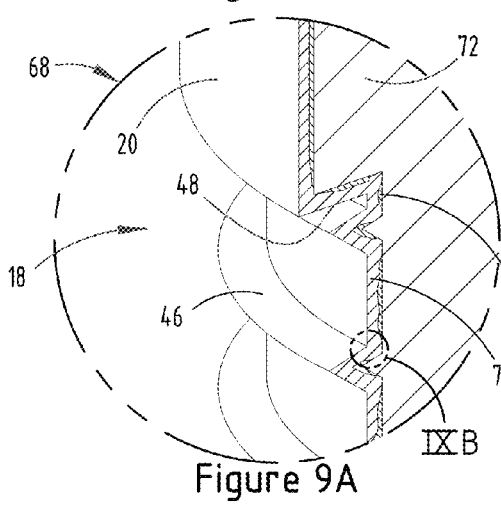
FIG. 9A is an enlarged cross-sectional perspective view of the power feedthrough after the application of electroless nickel plating, taken from section IXA in FIG. 9.
Figure 9B:
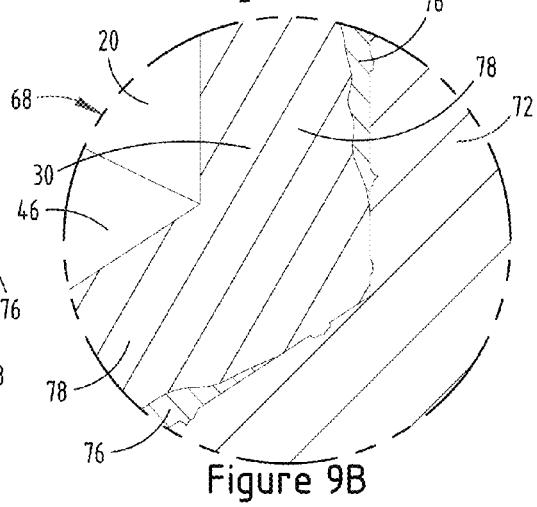
FIG. 9B is an enlarged cross-sectional perspective view of the power feedthrough after the application of electroless nickel plating, taken from section IXB in FIG. 9A.

The electroless nickel plating 30 is shown in FIGS. 9-9B evenly applied to the exterior surface 20 of the conductive member 18 over the electrolytic nickel plating 76. Once the exterior surface 20 has been activated by striking and/or apply the chemical solution used for cleaning the exterior surface 20, the electroless nickel plating step 68 is applied by submerging the conductive member 18 in a plating bath. The plating bath is an aqueous solution containing a chemical reducing agent and a high phosphorus nickel that has a phosphorus content generally between 10 and 15 percent and more preferably between 11 and 13 percent. Upon adhering to the exterior surface 20, the layer of electroless nickel plating 30 includes a very consistent thickness greater than 2 millimeters and more preferably between 2 and 3 millimeters. Accordingly, the outer surface 78 of the electroless nickel plating 30 is very smooth and generally free of pores. The smooth outer surface 78 of the electroless nickel plating 30 deters corrosive gases from weakening thin portions of the otherwise uneven electrolytic nickel plating 76, and thereby prevents corrosion of the copper shaft 72 exposed to the high temperatures and the corrosive atmosphere 36 in the furnace 12. Typically, the electroless nickel plating 30 does not require any heat treatment, as the corrosion resistance and useable life within the furnace 12 may be slightly compromised with a heat treatment applied to the electroless nickel plating 30.

Figures 10, 11:
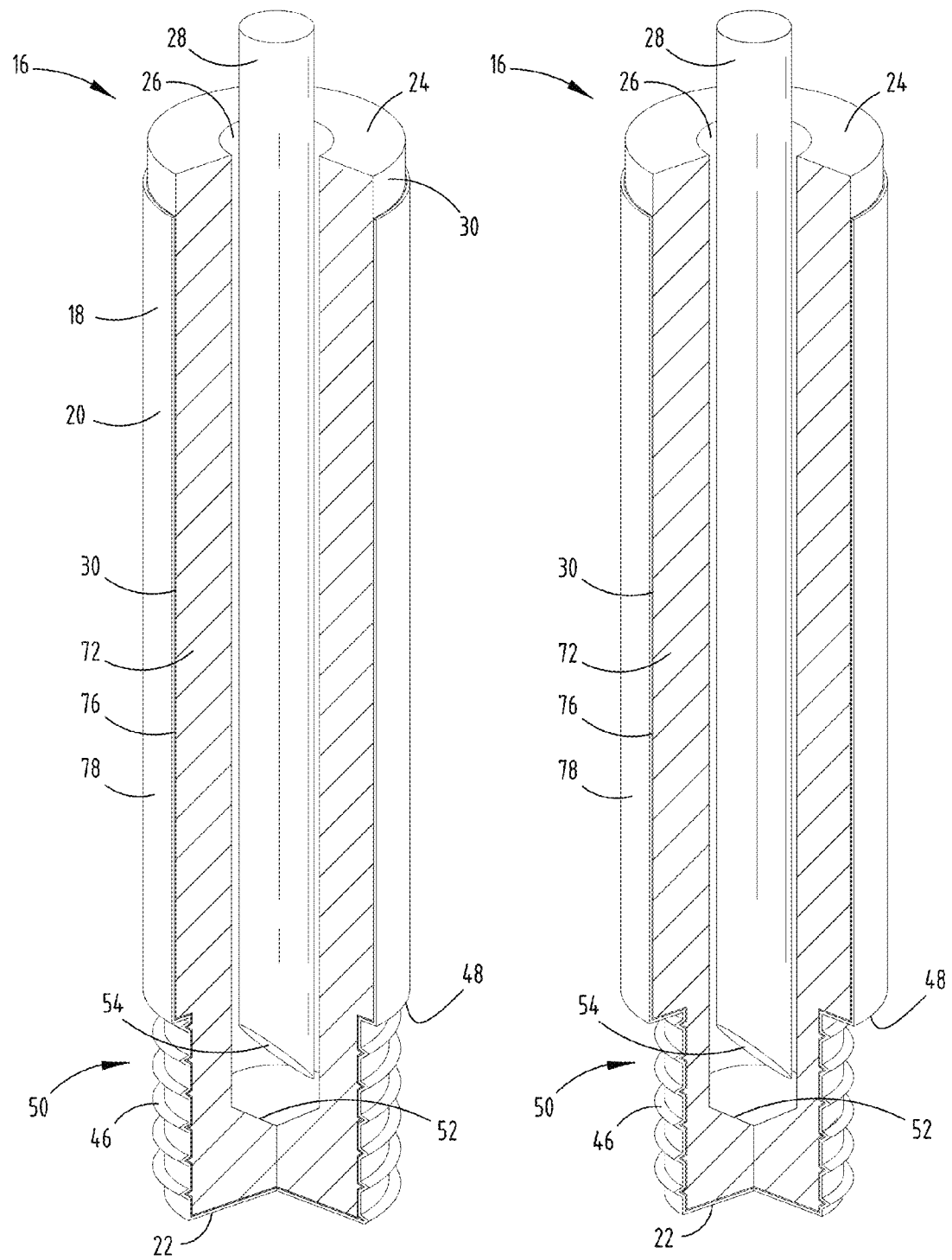
FIG. 10 is a top perspective cross-sectional view of the power feedthrough, according to the first embodiment.
FIG. 11 is a top perspective cross-sectional view of the power feedthrough, according to the second embodiment.

Referring now to the embodiments shown in FIGS. 10-11, the proximal ends 22 of the conductive members 18 are shown plated with the layers of electrolytic and electroless nickel plating 76, 30. As such, upon threadably engaging the connection portion 50 of the power feedthrough 16 with the threaded receptacle 44 on the heating element 14 (FIG. 1), the electrical current transmitted through the conductive member 18 will conduct through the layers of electrolytic and electroless nickel plating 30 to operate the heating element 14. As mentioned above, the illustrated embodiments may be altered by one having ordinary skill in the art to have alternative geometric shapes, different proportional thicknesses, and other alterations.

It will be apparent to those skilled in the art that various modifications and variations can be made without departing from the spirit or scope of the claims.

What is claimed is:

1. A method of making an electrode assembly for a furnace, comprising
providing a heating element within the furnace;
providing a power feedthrough having an end portion that extends into the furnace to couple with the heating element, wherein the power feedthrough includes a conductive member for transmitting electricity to the heating element, said conductive member of said power feedthrough including a shaft and being at least partially within the furnace;
cleaning at least an exterior surface of the conductive member adjacent to the proximate the end portion of the conductive member of the power feedthrough that is constructed to be situated within the furnace, said cleaning step comprising applying to the exterior surface at least one of:
(i) a chemical solution comprising: at least one of hydroxycarboxylic acid or salt, surfactant, a reducing agent;
(ii) a copper flash; and
applying an electroless nickel plating to the cleaned exterior surface of the conductive member for preventing corrosion of the conductive member within the furnace and pre-treating the exterior surface of the conductive member before depositing the electroless nickel plating wherein pre-treating includes applying an electrolytic sulfamate nickel plating to the exterior surface of the shaft; and
connecting the end portion of the power feedthrough to the heating element.

2. The method of claim 1, wherein the shaft is a copper shaft.

3. The method of claim 2, wherein the copper shaft has a cylindrical shape, and wherein the electrolytic sulfamate nickel plating includes a thickness between 0.0002 and 0.0004 inches.

4. The method of claim 1, wherein the conductive member includes a copper shaft, and wherein cleaning the exterior surface of the conductive member includes applying a copper flash to the exterior surface.

5. The method of claim 1, wherein cleaning the exterior surface of the conductive member includes applying a chemical solution to the exterior surface.

6. The method of claim 1, wherein the electroless nickel plating comprises a high phosphorous nickel having a phosphorus content between 11 and 13 percent.

7. The method of claim 1, wherein the electroless nickel plating includes a thickness between 2 and 3 millimeters.

8. The method of claim 1, wherein the end portion of the power feedthrough includes a threaded end and the heating element includes a threaded receptacle for coupling with the threaded end.

9. A method of making a power feedthrough for a furnace, comprising:
providing a copper shaft having an exterior surface, a distal end with an axial cavity, and a proximal end configured to couple with a heating element within the furnace;
cleaning at least the exterior surface of the conductive member proximate the proximal end to provide a clean surface, said cleaning step comprising applying to the exterior surface at least one of:
(i) a chemical solution comprising: at least one of hydroxycarboxylic acid or salt, surfactant, a reducing agent;
(ii) a copper flash; and
treating the exterior surface of the conductive member by applying an electrolytic sulfamate nickel plating to the clean surface; and
after the treating step applying an electroless high phosphorus nickel plating to the clean surface for preventing corrosion of the copper shaft within the furnace.

10. The method of claim 9, wherein the sulfamate nickel plating includes a thickness between 0.0001 and 0.0005 inches.

11. The method of claim 9, wherein cleaning includes applying a copper flash to the exterior surface of the copper shaft.

12. The method of claim 9, wherein cleaning includes applying a chemical solution to the exterior surface of the copper shaft.

13. The method of claim 9, wherein the electroless high phosphorous nickel plating includes a generally consistent thickness that is greater than 2 millimeters, and wherein the axial cavity is configured to receive a liquid coolant for cooling the copper shaft.

14. The method of claim 9, wherein the electroless high phosphorous nickel plating has a phosphorus content between 10 and 15 percent.

* * * * *